… ……………………

United States Patent Office 3,274,042
Patented Sept. 20, 1966

3,274,042
METHOD OF FORMING HOT PRESS PLYWOOD AND PRODUCT
Daniel P. Gilboe, Minneapolis, and Lynn C. Adolphson, St. Paul, Minn., assignors to Archer-Daniels-Midland Company, Minneapolis, Minn., a corporation of Delaware
No Drawing. Filed Apr. 27, 1962, Ser. No. 190,782
10 Claims. (Cl. 156—328)

This invention relates to improvements in the art of hot-pressing veneer and plywood by an improved method of utilizing unrefined vegetable protein flour as essentially the quick setting adhesive solidified in a period of about 2 to about 6 minutes, under pressure and heating conditions of about 240° to 300° F. where such proteins are not considered to be coagulated by heat, to form a rigid water resistant laminated body which can be handled and worked on in a period of about 2 hours after such heat set. More particularly the improvement relates to affording the plyboard and veneer art with an improved hot-press method of utilizing non-heat gelling globulin protein adhesives in the form of unrefined vegetable protein flours having over 30% globulin protein content of which at least 20% is water dispersible, in conjunction and combination with the condensation product of an aldehyde and a primary amine or ammonia under strongly alkali conditions of at least a pH of 12 and a pressing temperature of about 240° to 300° F.

The hot-press plywood industry has sought for many years for an efficient and economical way to use essentially a vegetable protein flour adhesive, and particularly a soy protein flour for heat bonding plyboard structure, with or without the addition of a silicate. An unrefined vegetable protein flour would not be expected to be heat set or operable, as such, in providing a hot press glue bond. That is, as high protein content vegetable protein flours, and of the character herin used, in contrast to starch, are not coagulated by heat, the hot-press art has used blood protein in combination with vegetable protein flour and silicate. The blood protein acts more nearly like starch and the silicate also forms a quick set under heat conditions. Thus, for quick setting, it has been considered necessary to supplement the non-heat gelling type vegetable protein flours with another heat setting adhesive, as blood albumin, starch and silicate. The starch and silicate adhesives are less water resistant than the vegetable flour proteins and the blood base adhesive is expensive, not so convenient to use and not always readily available. Otherwise, the art has primarily turned to resin bonds in hot-press veneer and plywood manufacture, unmodified proteins as soybean flour per se glues have not been known to be suited to the hot press system.

In comparable relationship, adhesives of the cold press process and their spread, as disclosed in Osgood Patent 1,950,060, are not indicative of what will be operable in the hot-press process. Its use, as disclosed, was inoperable in hot pressing to obtain a vegetable protein bond.

Accordingly, it is an object of this invention to provide the hot-press plyboard and veneer art with an improved method of prefabricating plyboard structure under a hot-press process utilizing essentially a non-heat gelling vegetable protein flour converted to a heat gelling adhesive and the product derived by the process.

It is another object of this improvement to provide the hot-press plyboard art with an economical advantage in reducing the amounts of adhesive spread and yet obtain comparable and improved plyboard structure utilizing a soy flour adhesive as the quick set gelling agent for providing the essential laminate bond, with or without addition of an extender modifier.

Essentially the improvement concerns utilizing unrefined or untreated vegetable protein flours, as peanut flour, soy flour and cottonseed flour, and mixtures of the same, which, as such, are not gelled or coagulated by heat to a rigid body, with an aldehyde and particularly acetaldehyde and ammonia or amine complex which is stable under normal working conditions and does not readily break down under highly alkaline pH conditions of a pH of 12 or more, until subject to temperatures of over 140° F. At about 240° F. to about 300° F. the operable amine-aldehyde complexes readily break down to quickly set the protein flour adhesive.

Here, the protein flour is preferably soy flour which is rendered heat setting to form a good initial quick-set bond and does not allow steam blows when applied in the manner herein described. In addition there is provided an economical advantage over both extended resin adhesives as well as blood soy adhesives for interior grade hot-press veneer and plywood.

To accomplish the foregoing and related ends, this invention then comprises the features hereinafter more fully described and inherently exemplified herein, and as particularly pointed out in the claims. The following description setting forth in detail certain illustrative embodiments of the invention and improvements, these being indicative, however, of but a few of the various ways in which the principle of this disclosure and benefits of the improvements may be employed.

The following examples are given to exemplify the present disclosure:

EXAMPLE I

|   | Parts by weight |
|---|---|
| (1) Soy flour | 100.00 |
| (2) Water | 415.00 |
| (3) Acetaldehyde-ammonia | 1.5 |
| (4) Caustic soda | 8.00 |
| (5) Lime | 9.00 |
| (6) Defoaming agent (pine oil) | 2.00 |

The above components are mixed into a slurry in the manner hereinafter described and having a pH value of over 12 which is stable over a long working period at normal room temperature. This slurry is also stable under normal conditions of use and storage at higher temperatures up to about 110° F. Also, under conditions of use at temperatures above 110° F. to 140° F. the use and storage conditions are reduced to a period of under 3 hours. Thus, the formulation provides an adequate working period in making up large batches for hot press plywood and veneer manufacture. If desired, the aldehyde amine complex may be added just before application in a spreading operation and thereby the slurry may be prepared much in advance of use.

The above mixture was then used in a 20% solids slurry form and applied by suitable spreading means to 1/10 inch "A" grade Douglas Fir veneer in the following spreads and hot pressed for 2½ minutes at 260° F. for making 5 ply plywood veneer. This veneer was evaluated according to the standard plywood shear test which determines breaking strength in lbs. per square inch. Wood failure is determined visually as a percent of the visible glue line.

Under the hot press system it was surprising to discover that decreasing amounts in spread obtained better results with preferably an optimum level of about 70 lbs./1000 square feet of double glue line below which adhesion is obtained but the glue line is starved, as exemplified by the following table:

TABLE 1

| Spread Pounds per 1,000 sq. ft. double glue line | Dry Strength | Wet Strength, 24 hr. Water Soak |
| --- | --- | --- |
| 105 lbs | 185 p.s.i.—38% wood failure. | 118 p.s.i.—10% wood failure. |
| 70 lbs | 248 p.s.i.—40% wood failure. | 125 p.s.i.—15% wood failure. |
| 50 lbs | 153 p.s.i.—34% wood failure. | 90 p.s.i.—5% wood failure. |

In a comparable test of Osgood's cold press adhesive, as described, 150 lbs. wet glue per 1000 square feet double glue line provided a dry strength 177 p.s.i.—32% wood failure and for wet strength (24 hour water soak) 74 p.s.i.—5% wood failure. In a like comparable hot press test of Osgood's adhesive the results were a complete failure as the veneer separated under the hot press heat and pressure. In further contrast, the hot-press adhesive herein described reduces the adhesive requirement for the double glue line by at least about one-half in the preferred embodiment.

In view of the conventional usage of a water soluble alkali metal silicate in this art and a desire to further reduce the cost of the vegetable protein adhesive, the above formulation may be extended by addition, for example of sodium silicate in amounts of about 25 parts up to about 35 parts based on 100 parts of vegetable protein flour. This further reduces the glue costs. Tests of the above formulation with 35 parts sodium silicates gave similar results exemplified in Table 1 and illustrates the improved results from even a lower spread rate of the vegetable protein flour adhesive.

The amine aldehyde complexes may be crystalline structures of the nature of:

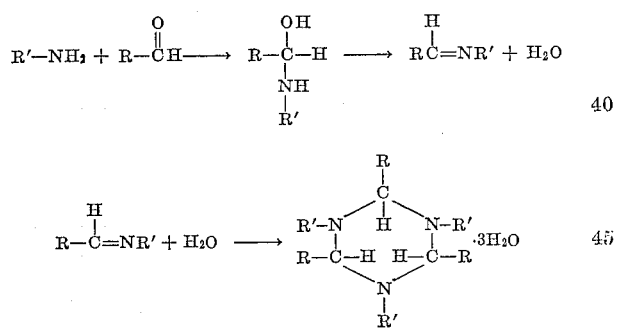

Wherein R and R' are hydrogen, other than in the combination of ammonia and formaldehyde, substituted and unsubstituted aliphatic groups of 1 to 22 carbon atoms, aromatic and heterocyclic rings containing no interfering group or groups which sterically hinder the formation of stable aldehydeamine complexes or inactivate the amine and aldehyde portion of the formed molecule complexes. Various amines may be exemplified by short chain aliphatic amines of or containing 2–8 carbon atoms as ethyl amine, ethylene diamine, di-ethylene triamine, and the like, aliphatic long chain primary amines as fatty amines of 8–26 carbon atoms as octyl amine, decylamine, fatty amines as stearyl amine and the like, modified aliphatic primary amines as ethanol amine and the like, amino acids as glycine and the like, modified primary amines as amino ethyl ethanol amine and the like, aromatic amines as aniline, benzyl amine, phenylene diamine, and the like, and fatty ether amines of 8–10 carbon atoms as alkoxy propylamine, and the like which are reactive with aldehydes and serve as blocking agents useful in the hot press plywood vegetable protein adhesive systems. Such aldehyde-amine complexes serve, when released under hot press conditions to cause the soy flour or like non-heat gelling protein adhesive to quickly gel and obtain a fast bonding action when spread as thin hot press plywood and veneer adhesive films, as herein described.

Illustrative aldehydes found most useful and exemplary are preferably formaldehyde with amines, acetaldehyde, isobutyraldehyde, azelaaldehyde, pelargonaldehyde, capraldehyde and the like short and long chain aliphatic aldehydes, dialdehydes as glutaraldehyde and the like. Less preferably other aldehydes as benzaldehyde, salicylaldehyde, phthalaldehyde, furfural, epoxy aldehydes as glycidaldehydes and epoxy acetals as epoxy aldehyde alkyl alkenyl acetate, aryl aldehyde alkenyl epoxy alkyl acetals and the like, acetadol and dialdehyde starch my be used to form the reactive compounds. It will be recognized that other suitable cross-linking or protein curing aldehydes, which form with ammonia and primary amines operable combinations are likewise useful complexes, when added to the soy and like vegetable protein flour adhesive slurrys as herein described. Such adhesives can be spread in measurably reduced amounts, to obtain an economically practical quick-setting hot press plywood and veneer bond, with or without an alkali metal silicate, as an extender. The alkali metal silicate, as sodium silicate, is of relatively less cost and further illustrates an economic advantage in reducing the amount of quick setting vegetable protein bonding agent for plywood veneer in the hot press method, as herein disclosed. The aldehyde amine complex forms a sufficiently stable aldehydogenic agent that breaks down with heat to form a free aldehyde as illustrated, this is preferably combined with soy flour to form a quick, heat gelling adhesive of new advantage and use in prefabricating hot press plywood and veneer.

Further examples, illustrative of hot press adhesive compositions having a pH greater than 12 and their mode of application are provided as follows:

EXAMPLE II

Ingredient: Parts
- (1) Water (75° F.) _____ 200
- (2) Defoamer _____ 2
- (3) Soy flour (protein 70% soluble) _____ 100
- (4) Water (75° F.) _____ 200
- (5) Acetaldehyde-ethyl amine _____ 6
- (6) Lime slurried (calcium hydroxide) _____ 9
    in water _____ 18
- (7) 50% caustic soda _____ 16
- (8) Sodium silicate ("N" grade) _____ 35
- (9) Pentachlorophenol _____ 4

EXAMPLE III

Ingredient:
- (1) Water (75° F.) _____ 200
- (2) Defoamer _____ 2
- (3) Soy flour (protein 70% soluble) _____ 100
- (4) Water (75° F.) _____ 175
- (5) Acetaldehyde-aniline _____ 9.3
- (6) Lime slurried (calcium hydroxide) _____ 9
    in water _____ 18
- (7) 50% caustic soda _____ 16
- (8) Sodium silicate ("N" grade) _____ 35
- (9) Pentachlorophenol _____ 4

EXAMPLE IV

Ingredient:
- (1) Water (75° F.) _____ 200
- (2) Defoamer _____ 2
- (3) Soy flour (protein 70% soluble) _____ 100
- (4) Water (75° F.) _____ 200
- (5) Acetaldehyde-ammonia _____ 1.4
- (6) Lime slurried (calcium hydroxide) _____ 9
    in water _____ 18
- (7) 50% caustic soda _____ 16
- (8) Sodium silicate ("N" grade) _____ 35
- (9) Pentachlorophenol _____ 4

EXAMPLE V

Ingredient:
- (1) Water (75° F.) _____ 200
- (2) Defoamer _____ 2
- (3) Soy flour (protein 70% soluble) _____ 100
- (4) Water (75° F.) _____ 175
- (5) Formaldehyde-ethylene diamine _____ 1.0
- (6) Lime slurried (calcium hydroxide) (18 parts in water) _____ 9
- (7) 50% caustic soda _____ 16
- (8) Sodium silicate ("N" grade) _____ 35
- (9) Pentachlorophenol _____ 4

EXAMPLE VI

Ingredient:
- (1) Water (75° F.) _____ 200
- (2) Defoamer _____ 2
- (3) Soy flour (protein 70% soluble) _____ 100
- (4) Water (75° F.) _____ 175
- (5) Glutaraldehyde-ammonia _____ 4.2
- (6) Lime slurried (calcium hydroxide) (18 parts in water) _____ 9
- (7) 50% caustic soda _____ 16
- (8) Sodium silicate ("N" grade) _____ 35
- (9) Pentachlorophenol _____ 4

EXAMPLE VII

Ingredient:
- (1) Water (75° F.) _____ 200
- (2) Defoamer _____ 2
- (3) Soy flour (50% protein soluble) _____ 100
- (4) Water (75° F.) _____ 200
- (5) Acetaldehyde-ammonia _____ 4.2
- (6) Lime slurried (calcium hydroxide) (18 parts in water) _____ 9
- (7) 50% caustic soda _____ 16
- (8) Sodium silicate ("N" grade) _____ 35
- (9) Pentachlorophenol _____ 4

EXAMPLE VIII

Ingredient:
- (1) Water (75° F.) _____ 200
- (2) Defoamer _____ 2
- (3) Peanut flour _____ 100
- (4) Water _____ 300
- (5) Acetaldehyde-ammonia _____ 2.0
- (6) Lime slurried (calcium hydroxide) (18 parts in water) _____ 9
- (7) 50% caustic soda _____ 16
- (8) Sodium silicate ("N" grade) _____ 35
- (9) Pentachlorophenol _____ 4

EXAMPLE IX

Ingredient:
- (1) Water (75° F.) _____ 200
- (2) Defoamer _____ 2
- (3) Soy flour (protein—70% soluble) _____ 100
- (4) Water _____ 150
- (5) Aldehyde-amine compound _____ 0
- (6) Lime slurried (calcium hydroxide) (18 parts in water) _____ 9
- (7) 50% caustic soda _____ 16
- (8) Sodium silicate ("N" grade) _____ 35
- (9) Pentachlorophenol _____ 4

The deformer was a conventional agent as pine oil, or a like conventional defoamer.

Each of the examples were prepared for use as a plywood adhesive by the following method. The water, the defoamer, and the soy flour were blended and mixed lump free for five minutes in a paddle-type mixer. The additional water was then added and mixed for one minute. The balance of the components were added sequentially and individually followed by a one-minute mix after each addition. Following the final addition of pentachlorophenol the adhesive system was mixed for an additional five minutes followed by a ten-minute standing period prior to use. In each case, the adhesive prepared is of a workable viscosity and remains so throughout the test period. Table 2 illustrates the viscosity stability of the adhesive systems described in the above examples. It will be noted that very little viscosity change has taken place after at least two hours standing at room temperature.

The above specific examples are merely illustrative of the invention and numerous modifications will be apparent. For example, it is not necessary that the aldehyde-amine be added to the glue mix immediately prior to use. The aldehyde-amine may be pre-blended with the soy flour in a dry blending operation and subsequently used in this form, in about an 18% to 30% water slurry. Otherwise, it is possible to add the aldehyde-amine as a solution or in solid form to the slurry made in daily preparation for application to the hot press system of forming plywood and veneer, as herein disclosed.

The following is illustrative of results obtained in utilizing the above formulations, as heretofore indicated:

TABLE 2.—VISCOSITY STABILITY

| Adhesive | Stormer Viscosity Seconds/100 rev. with 1,200 g. weight | | |
|---|---|---|---|
| | 0 Time | 1 Hour | 2 Hours |
| (1) Example 2 | 130 | 126 | 158 |
| (2) Example 3 | 160 | 172 | |
| (3) Example 4 | 20 | 52 | 89 |
| (4) Example 5 | 50 | 40 | 52 |
| (5) Example 6 | 48 | 69 | 104 |
| (6) Example 7 | 164 | 169 | 156 |
| (7) Example 8 | 70 | 48 | 40 |
| (8) Example 9 (Control) | 132 | 150 | 164 |

TABLE 3.—STEAM BLOWS

Adhesive: Number of steam blows/panels tested
- (1) Example 2 _____ 0/4
- (2) Example 3 _____ 0/4
- (3) Example 4 _____ 0/4
- (4) Example 5 _____ 0/4
- (5) Example 6 _____ 0/4
- (6) Example 7 _____ 0/4
- (7) Example 8 _____ 0/4
- (8) Example 9 _____ 3/4

TABLE 4.—WATER RESISTANCE

| Adhesive | Percent Passage | |
|---|---|---|
| | 3 cycle | 5 cycle |
| (1) Example 2 | 100 | 95 |
| (2) Example 3 | 100 | 92 |
| (3) Example 4 | 96.7 | 90.3 |
| (4) Example 5 | 100 | |
| (5) Example 6 | 100 | |
| (6) Example 7 | 100 | |
| (7) Example 8 | 95 | |
| (8) Example 9 | 92.5 | |

*Detailed description*

Each of the preceding examples has been examined under standard conditions of being applied as a hot press plywood adhesive. While the silicate may be eliminated and test results, as exemplified in Example I, obtained, for practical commercial application, the above adhesives were prepared and tested using veneer with dimensions 6" x 6" x 1/10". Veneer with other dimensions has on occasion been substituted with similar results. With a suitable glue spreader, the adhesive was applied to a ply laminate surface so as to achieve a spread of approximately 75 to 80 pounds of wet glue per 1000 square feet of double glue line. In general the coated plys were placed in face to face contact with a respective uncoated laminate and two closed assembly times were used for the above evaluations. A glue composition is tested both with a maximum layup time of 0.5 minute and with a maximum layup of 15 minutes. In each case the glue composition performs in the broad range of assembly time from 0.5 minute to 20 minutes. However, in commercial usage the compositions performed very well within the preferred assembly times of from 3 to 14 minutes. In making a 5-ply board from 1/10" veneer with one panel per press opening, it has been found convenient to use standard operating conditions of 2 minutes press time with a press platen temperature of 300° F. or 2.25 minutes, at 240° F., at a constant pressure of 140 p.s.i. This is a broad range and a preferred range would be dependent on the aldehyde-amine combinations employed in the vegetable protein adhesive system. Thus, for example, soy flour and formaldehyde-ethylene diamine requires 300° F. for 2 minutes while acetaldehyde ethyl amine performs well at 240° F. for 2.25 minutes. The press pressure also will be dependent on individual cases. Normally a broad range of from 100–200 p.s.i. may be employed. For two panels per opening with 5 ply, 1/10" veneer normally the press time would run from 6 minutes at 240° F. to 5 minutes at 300° F. It will be recognized by those utilizing the hot press system, these times would be somewhat variable depending on the veneer thickness and number of plys. From the above, it will be recognized that optimum conditions of hot pressing are dependent upon the individual selection with respect to minimum time and temperature and each plant system will be adjusted to suit its own conditions.

In practical application of a plant processing schedule showing the relative times and temperature of operation for the soy flour adhesive, the following hot pressing schedule is given:

single sheet veneering and the bond set up under a comparable pressure and heating schedule, as exemplified.

Following pressing and removal from the press the plywood can be stored in the usual manner, if used immediately after pressing, formed panels should preferably not be sawed for at least 2 hours. Normally a conditioning period of 24 hours at room temperature was used to simulate plant conditions of indefinite storage. The effectiveness of a plywood glue may be evaluated from various test procedures carried out on the plywood. The simplest test which indicates the capabilities of a glue is the so-called "knife test." This test consists simply of prying apart the laminae by means of a jackknife and observing both the effort required to delaminate the panel and the degree of wood and glue failure. This test is strictly qualitative but does indicate in a relative way the adequacy of a glue. In all cases cited in the examples the glue bond was judged very good to excellent.

The adhesive is also evaluated for its ability to prevent "steam blows" which cause ply separations. "Steam blows" arise from the fact that during pressing, the free, unbound water in the adhesive is super heated to form steam. The pressure buildup between the plys due to the steam counteracts the binding of the plys by the adhesive causing ply separation usually between the outer laminae. Separation between the inner veneers is generally charged to the inability of a particular adhesive to "set" quickly. "Steam blows" are quite obvious since they are usually accompanied by a "popping" noise and an emission of steam at the site of the ply separation. Table 3 indicates that no steam blows occurred with any of the adhesive systems cited in the several examples containing aldehyde-amine when spread in the manner illustrated.

One of the most important tests employed in examination of the adhesives cited in the preceding examples was

TABLE 5

| Rough Panel Thickness | No. of Plies | Panels Per Opening | Glue Spread | Pressing Time in Minutes (full pressure) | | | |
|---|---|---|---|---|---|---|---|
| | | | | 230° F. | 240° F. | 260° F. | 280° F. |
| 1/4" | 3 | 2 | 70 | 3 | 2¾ | | |
| 5/16" | 3 | 1 | 75 | 1¾ | 1½ | 1¼ | 1 |
| 5/16" | 3 | 2 | 75 | 3½ | 3 | 2¾ | 2¼ |
| 5/16" | 3 | 3 | 80 | | 7 | 6 | 5¼ |
| 3/8" | 3 | 1 | 80 | 1¾ | 1¾ | 1½ | 1¼ |
| 3/8" | 3 | 2 | 80 | | 4¼ | 3¾ | 3 |
| 7/16" | 3 | 1 | 85 | 2 | 1¾ | 1¾ | 1½ |
| 7/16" | 3 | 2 | 85 | | 4½ | 4¼ | 4 |
| 7/16" | 5 | 1 | 70 | 3 | | | |
| 7/16" | 5 | 2 | 70 | | 6 | | |
| 1/2" | 5 | 1 | 75 | 2¾ | 2¼ | 2 | 1¾ |
| 1/2" | 5 | 2 | 80 | | 6 | 5½ | 5 |
| 9/16" | 5 | 1 | 80 | 2¾ | 2¼ | 2¼ | 2 |
| 9/16" | 5 | 2 | 85 | | 7 | 6 | 5¼ |
| 5/8" | 5 | 1 | 80 | 3½ | 3 | 2¼ | 2¼ |
| 5/8" | 5 | 2 | 85 | | 7½ | 6½ | 5½ |
| 11/16" | 5 | 1 | 85 | 4 | 3½ | 3 | 2½ |
| 11/16" | 7 | 1 | 85 | 4¼ | 4 | 3¾ | 3½ |
| 3/4" | 5 | 1 | 85 | | 4¼ | 3¾ | 3 |
| 3/4" | 7 | 1 | 85 | | 5 | 4¼ | 3¾ |
| 13/16" | 5 | 1 | 85 | | 4½ | 3¾ | 3¼ |
| 13/16" | 7 | 1 | 85 | | 6 | 4¼ | 4 |
| 7/8" | 7 | 1 | 85 | | | 5 | 4¼ |
| 15/16" | 7 & 9 | 1 | 90 | | | 6 | 5 |
| 1" | 7 & 9 | 1 | 90 | | | 7 | 5½ |
| 1 1/16" | 7 & 9 | 1 | 95 | | | 7 | 6 |
| 1 3/16" | 7 & 9 | 1 | 95 | | | 8 | 6½ |
| 1 5/16" | 9 | 1 | 100 | | | 9 | 7 |
| 1 7/16" | 9 | 1 | 100 | | | 10 | 8 |
| 1 9/16" | 9 & 11 | 1 | 100 | | | 12 | 9 |

Assembly time: Minimum 3 minutes, maximum 25 minutes.
5 lb. extra spread, as minimum, on rough or warm core.
Core not to exceed 110°F.
Veneer moisture content not to exceed 5%.
*Veneer moisture content not to exceed 3% at 280° F.
Not 100–700 lbs. hydraulic pressure.
Spread test piece, 12¾" x 25°
*Pounds of wet adhesive per 1000 square feet double glue line.

While the above table is adapted to a standard procedure for double glue line plywood and veneer schedules, it will be readily understood that a single glue line will be approximately half glue spread per 1000 square feet for the 3-cycle water resistance test for Douglas Fir interior grade plywood according to Commercial Standards CS-45-60, paragraph 5.2. Two, 2-inch by 5-inch specimens of plywood, cut from a 6" x 6" panel so that the long edge is with the grain, were submerged in water at room temperature for a period of 4 hours. The specimens were then dried at a temperature between 100–105° F. for a period of 19 hours with sufficient air circulation in the drying cabinet to lower the moisture content of the specimen to a maximum of 8%, based on the oven dry weight. The results were interpreted according to Commercial Standard CS-45-60 paragraph 5.4.1. A total, continuous, visible delamination of ¼″ or more in depth and over 2″ in length along the edges of a 2″ x 5″ specimen is considered a failure. Table 4 gives the data on water resistance for the various adhesives cited in the examples previously given. A passing score for 3 cycles is 85%. Each and all of the examples measured well over the passing score.

Of major importance in our plywood glue evaluation tests has been the viscosity stability of the adhesive. As Table 2 indicates, each of the representative examples tends to give only very slight differences in viscosity with time. In no case have we observed the adhesive systems incorporating aldehyde-amines gelling at least within a two-hour period and generally there is no significant thickening of the adhesive making it unsuitable for application to plywood. Upon application of heat, it will be recognized that break-down of the aldehyde from the amine blocking agent will of course vary somewhat relative to the particular amine portion of the condensation product. This is readily determinable by a plant operator.

It will be further recognized that due to the varying activity of such amine aldehyde complexes, the stability of the vegetable protein flour adhesive can be effectively controlled by properly selecting the amine blocking agent. Each of the amines form a condensation product with a particular aldehyde to provide a more or less specific selective stability. Thus, it is possible to employ a particular aldehyde under the hot press conditions, as described, while retaining control of the gelling characteristics, such as time and temperature range, as well as maintaining workable viscosity of the adhesive. In a more complete investigation of the use of aldehyde and amines in the hot press plywood and veneer art it has been found that the operable forms of the condensation aldehyde-amine product must have at least one reactive hydrogen. Tertiary amines and secondary amines are not operative.

The advantage of this new adhesive system in the hot press plywood and veneer processing is a marked improvement over previous soy flour adhesives particularly in its ability to set up quickly with heat. The plywood and veneer industry is thus provided with a new and useful hot press process by which a non-gelling type vegetable protein in combination with an aldehyde can be incorporated into a single wet adhesive system with retention of workable viscosity stability under highly alkaline pH levels and normal room temperature conditions. The new hot press soy flour adhesive system, when spread in the limits defined, has another advantage in ability to be used with fairly wet or high moisture content veneers and non-tackiness for ease of handling. An addition factor is that during assembly time, when several plywood sheets are prepared for simultaneous pressing, the herein described adhesive does not fail in the initially prepared plywood sheet or in the final sheet. Therefore the assembly time is not detrimental as is the case in many other hot press plywood adhesive systems.

As many variations and modifications of this disclosure of invention or improvement as set forth may be made without departing from the spirit and scope thereof, the specific embodiments are given by way of example illustrative of the improvements provided which is to be limited only by the terms of the claims.

We claim:

1. A composition comprising a vegetable protein and the reaction product of an aldehyde and a primary amine having a structure selected from the group consisting of

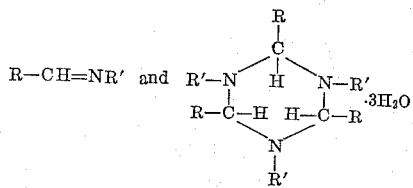

where R and R′ are selected from the group consisting of aliphatic of 1 to 22 carbon atoms, aromatic, hydrogen, and heterocyclic, with the proviso that when R is hydrogen, R′ is not hydrogen, and when R′ is hydrogen, R is not hydrogen.

2. A composition which is stable at room temperature and which will react to form an adhesive material when subjected to an elevated temperature and pressure, comprising a mixture at a pH of at least 12 of a vegetable protein, water, and the reaction product of an aldehyde and a primary amine having a structure selected from the group consisting of

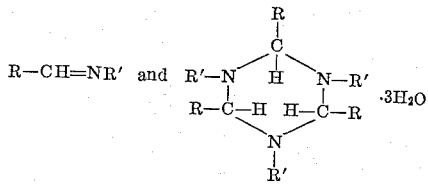

where R and R′ are selected from the group consisting of aliphatic of 1 to 22 carbon atoms, aromatic, hydrogen and heterocyclic, with the proviso that when R is hydrogen, R′ is not hydrogen, and when R′ is hydrogen, R is not hydrogen.

3. A composition which is stable at room temperature and which will react to form an adhesive material when subjected to an elevated temperature and pressure, comprising a mixture at a pH of at least 12 of a vegetable protein, water, defoamer, lime, caustic soda, sodium silicate, and the reaction product of an aldehyde and a primary amine having a structure selected from the group consisting of

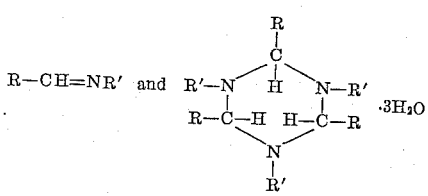

where R and R′ are selected from the group consisting of aliphatic of 1 to 22 carbon atoms, aromatic, hydrogen, and heterocyclic and with the proviso that when R is hydrogen, R′ is not hydrogen, and when R′ is hydrogen, R is not hydrogen.

4. A composition comprising a mixture at a pH of at least 12 of soya protein, water, and the reaction product of acetaldehyde and ammonia.

5. A composition comprising a mixture at a pH of at least 12 of soya protein, water and the reaction product of formaldehyde and ethylenediamine.

6. A composition comprising a mixture at a pH of at least 12 of soya protein, water, and the reaction product of acetaldehyde and ethylamine.

7. A composition comprising a mixture at a pH of at least 12 of soya protein, water, and the reaction product of acetaldehyde and aniline.

8. A method of laminating sheets of materials comprising (A) coating a sheet with a mixture, having a pH of at least 12, which is stable at room temperature and which will react to form an adhesive material when subjected to elevated temperatures and pressures comprising
(1) a vegetable protein,
(2) water, and
(3) the reaction product of an aldehyde and a primary amine having a structure selected from the group consisting of:

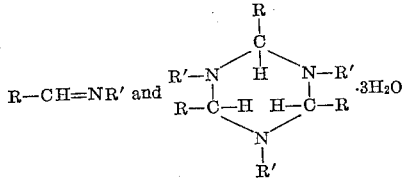

where R and R' are selected from the group consisting of aliphatic of 1 to 22 carbon atoms, aromatic, hydrogen and heterocyclic with the proviso that when R is hydrogen, R' is not hydrogen, and when R' is hydrogen, R is not hydrogen;
(B) placing the coated sheet in a surface-to-surface relation with another sheet; and
(C) pressing the two sheets together at an elevated temperature.

9. A method of laminating sheets of materials comprising
(A) coating a sheet with a mixture, having a pH of at least 12, which is stable at room temperature and which will react to form an adhesive material when subjected to a temperature of about 240° to 300° F. and a pressure of about 100 to 200 p.s.i. comprising
(1) a vegetable protein,
(2) water, and
(3) the reaction product of an aldehyde and a primary amine having a structure selected from the group consisting of

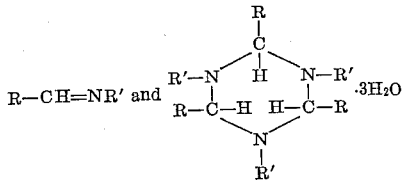

where R and R' are selected from the group consisting of aliphatic of 1 to 22 carbon atoms, aromatic, hydrogen and heterocyclic with the proviso that when R is hydrogen, R' is not hydrogen, and when R' is hydrogen, R is not hydrogen;

(B) placing the coated sheet in a surface-to-surface relation with another sheet;
(C) pressing the two sheets together at a pressure of 100 to 200 p.s.i.; and
(D) subjecting the pressed sheets to a temperature of 240° to 300° F. for a period of about 2 to 6 minutes.

10. A method of laminating sheets of material comprising
(A) coating a wooden sheet with a mixture, having a pH of at least 12, which is stable at room temperature and which will react to form an adhesive material when subjected to an elevated temperature and pressure comprising
(1) soya protein,
(2) water, and
(3) the reaction product of an aldehyde and a primary amine selected from the group consisting of
(a) acetaldehyde-ammonia,
(b) formaldehyde-ethylenediamine,
(c) acetaldehyde-ethylamine, and
(d) acetaldehyde-aniline;
(B) placing the coated sheet in a surface-to-surface relation with another sheet;
(C) pressurizing the sheets at a pressure of 100 to 200 p.s.i.; and
(D) heating the pressurized sheets at a temperature of about 240° to 300° F. for a period of about 2 to 6 minutes.

References Cited by the Examiner
UNITED STATES PATENTS

| | | | |
|---|---|---|---|
| 1,877,202 | 9/1932 | Satow. | |
| 2,143,023 | 6/1935 | Meigs | 260—112 X |
| 2,238,307 | 1/1938 | Brother et al. | 260—123.5 |
| 2,262,770 | 11/1941 | La Piana | 260—6 |
| 2,630,414 | 3/1953 | Stoecker | 260—6 |

FOREIGN PATENTS

| | | |
|---|---|---|
| 476,869 | 12/1937 | Great Britain. |
| 524,681 | 8/1940 | Great Britain. |

OTHER REFERENCES

Delmonte, J. Technology of Adhesives, N.Y., Reinhold, 1947 TP 968. D4, pp. 266–269.

Brother et al., Protein Plastics from Soybean Products, Ind. and Eng. Chem. 30 (11), pp. 1236–1240, November 1938.

EARL M. BERGERT, *Primary Examiner.*

W. B. WALKER, J. F. MATHEWS, *Assistant Examiners.*